UNITED STATES PATENT OFFICE.

WILLIAM HENRY PERKIN AND CHARLES WEIZMANN, OF MANCHESTER, ENGLAND, ASSIGNORS TO RESEARCH SYNDICATE LIMITED, OF LONDON, ENGLAND.

PROCESS OF MANUFACTURING ISOPRENE.

991,453.  Specification of Letters Patent.  Patented May 2, 1911.

No Drawing.  Application filed March 17, 1911.  Serial No. 615,054.

*To all whom it may concern:*

Be it known that we, WILLIAM HENRY PERKIN, Ph. D., F. R. S., and CHARLES WEIZMANN, both subjects of the King of Great Britain and Ireland, of The University, Manchester, in the county of Lancaster, England, have invented new and useful Improvements in the Process of Manufacturing Isoprene, of which the following is a specification.

This invention relates to a process of producing isoprene which may be used as an intermediate product in the manufacture of caoutchouc.

According to this invention, either of the following four amyl-alcohols, or a mixture of two, or more, of them, is treated, as hereinafter described, for the production of isoprene, which can be condensed and polymerized for the production of caoutchouc. The amyl-alcohols referred to are the following derivatives of isopentane, viz.:

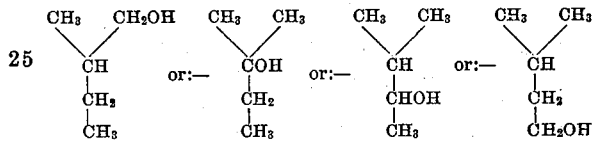

The derivative selected, or a mixture of two, or more, of the said derivatives, is, by dehydration, converted into one, or more, of the amylenes:—

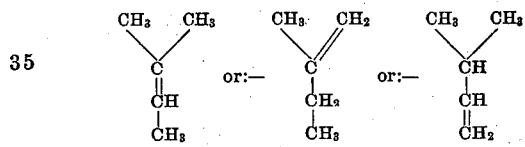

This dehydration can be effected in any suitable manner, such, for instance, as by the action of zinc chlorid, the reaction being accelerated by heat. Either of the said amylenes is then treated so that it loses two atoms of hydrogen and isoprene is produced. This is effected, in the case of one, or more, of the amylenes, by the action of heat and can be done by passing the amylene through a tube heated to dull redness, or by treatment of one, or more, of the amylenes, with bromin, or chlorin, forming a dihalogen derivative and subsequently removing two molecular proportions of hydrogen bromid, or hydrogen chlorid.

The following is an example of how this invention may be performed but the invention is not limited to this example. Two parts by weight of ordinary fermentation amylic alcohol are mixed with one part by weight of zinc chlorid and the mixture is allowed to stand in the cold for twenty-four hours and is then distilled, the zinc chlorid removing one molecular proportion of water from the amylic alcohol and yielding amylene. This amylene is then passed through a tube heated to redness and loses two atoms of hydrogen and isoprene is produced. This isoprene may be then converted into caoutchouc by condensation and polymerization.

In the above example instead of passing the amylene through a heated tube, to convert it to isoprene, it can be treated with chlorin, or bromin, or both, and the halogen compound obtained be treated with an agent (such as diethyl-anilin, alcoholic potash, or sodium ethylate) which will combine with the hydrobromic acid and convert the said compound into isoprene.

Having now particularly described and ascertained the nature of our said invention, and in what manner the same is to be performed, we declare that what we claim is:—

1. The process of producing isoprene which comprises dehydrating alcoholic derivatives of isopentane and then removing hydrogen from the resulting amylenes, substantially as described.

2. The process of producing isoprene which comprises dehydrating an ayml alcohol derived from isopentane and then removing hydrogen from the resulting amylene, substantially as described.

3. The process of producing isoprene which comprises dehydrating, with zinc chlorid, alcohol derivatives of isopentane and then removing hydrogen from the resulting amylenes, substantially as described.

4. The process of producing isoprene which comprises dehydrating an amyl alcohol derived from isopentane and then removing two atoms of hydrogen from the resulting amylene.

5. The process of producing isoprene which comprises dehydrating alcoholic derivatives of isopentane and then removing hydrogen from the resulting amylenes, by passing the latter through a heated tube, substantially as described.

In testimony whereof we have signed our names to this specification in the presence of two subscribing witnesses.

WILLIAM HENRY PERKIN.
CHARLES WEIZMANN.

Witnesses:
　Ernest Rowley,
　John Mathieson.